United States Patent [19]

Liu et al.

[11] Patent Number: 5,047,252
[45] Date of Patent: Sep. 10, 1991

[54] BEVERAGE INFUSION DEVICE AND METHOD

[75] Inventors: Richard T. Liu, Worthington; Alva D. Oren, Hilliard; Dean F. Rushmore, Marysville; Donald L. Wetherilt, Powell, all of Ohio

[73] Assignee: Nestec S.A., Vevey, Switzerland

[21] Appl. No.: 339,447

[22] Filed: Apr. 17, 1989

Related U.S. Application Data

[63] Continuation-in-part of Ser. No. 313,420, Feb. 22, 1989, abandoned.

[51] Int. Cl.$^5$ .............................................. B65B 29/04
[52] U.S. Cl. ........................................ 426/79; 426/82; 99/323
[58] Field of Search ................................. 426/77–84; 99/287, 323

[56] References Cited

U.S. PATENT DOCUMENTS

| | | | |
|---|---|---|---|
| 1,225,690 | 5/1917 | Wiberg | 99/287 |
| 1,428,046 | 9/1922 | Mock | 99/287 |
| 1,572,861 | 2/1926 | Larrey | 99/323 |
| 1,984,047 | 12/1934 | Thiene | 99/302 C |
| 2,022,467 | 11/1935 | Heyman | 426/78 |
| 2,072,976 | 3/1937 | Andrus | 206/0.5 |
| 2,110,732 | 3/1938 | Kane | 426/78 |
| 2,285,113 | 6/1942 | Eaton | 99/287 |
| 2,291,278 | 7/1942 | Cleaves | 426/82 |
| 2,716,607 | 8/1955 | Waline | 426/79 |
| 2,791,505 | 5/1957 | Barnett | 426/79 |
| 2,793,120 | 5/1957 | Bennett | 426/79 |
| 2,858,762 | 11/1958 | Wade | 99/287 |
| 3,257,212 | 6/1966 | Kasket | 426/82 |
| 3,339,476 | 9/1967 | Detroya | 99/287 |
| 3,342,518 | 9/1967 | Gorton | 426/82 |
| 3,542,561 | 11/1970 | Rambold | 426/79 |
| 3,654,852 | 4/1972 | Rosan | 99/323 |
| 3,692,536 | 9/1972 | Fant | 426/79 |
| 4,141,997 | 2/1979 | Syroka et al. | 426/82 |
| 4,211,156 | 7/1980 | Zimmermann | 99/287 |
| 4,215,628 | 8/1980 | Dodd | 426/82 |
| 4,410,550 | 10/1983 | Gaskill | 99/287 |
| 4,443,481 | 4/1984 | Donarumma et al. | 98/295 |
| 4,465,697 | 8/1984 | Brice et al. | 426/79 |
| 4,651,870 | 3/1987 | Giambalva | 426/82 |
| 4,801,464 | 1/1989 | Hubbard | 426/79 |

FOREIGN PATENT DOCUMENTS

| | | | |
|---|---|---|---|
| 158511 | 10/1985 | European Pat. Off. | 426/77 |
| 1795868 | 9/1959 | Fed. Rep. of Germany | 426/82 |
| 3544263 | 6/1987 | Fed. Rep. of Germany | 426/77 |
| 658780 | 12/1986 | Switzerland | 426/77 |
| 323436 | 7/1930 | United Kingdom | 426/82 |

OTHER PUBLICATIONS

Coffee Int'l, Issue Three, 1975, p. 30 plus, 4/26/78.

Primary Examiner—Steven Weinstein

[57] ABSTRACT

A beverage infusion device for preparing an individual cup of an infusible beverage such as coffee and tea. The device includes one or more porous pouches containing infusible material permanently or removably secured to a rotatable, hand held shaft, with the pouches extending radially outwardly from the shaft and dimensioned to fit within a conventional beverage cup or mug. In use, the device is inserted in a cup of hot water and the shaft is rotated between the thumb and finger of the user in alternating clockwise and counter-clockwise directions. Upon rotation of the shaft and the pouches secured to the shaft, a centrifugal flow pattern is created in water which enhances the efficiency of extraction of the infusible material. When the pouches are permanently secured to the shaft, the entire device is discarded after use. When the pouches are removably secured to the shaft, the pouches are separated from the shaft after use and discarded, with the shaft portion of the device being reusable.

13 Claims, 3 Drawing Sheets

FIG. 6
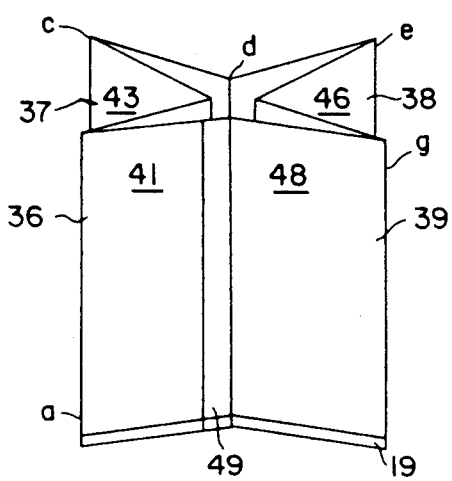
FIG. 8
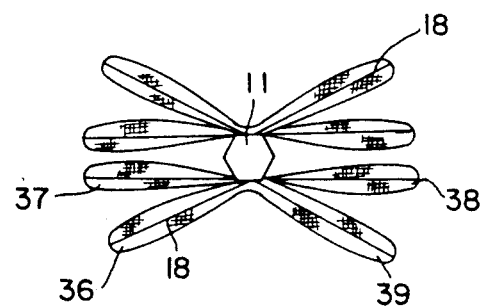
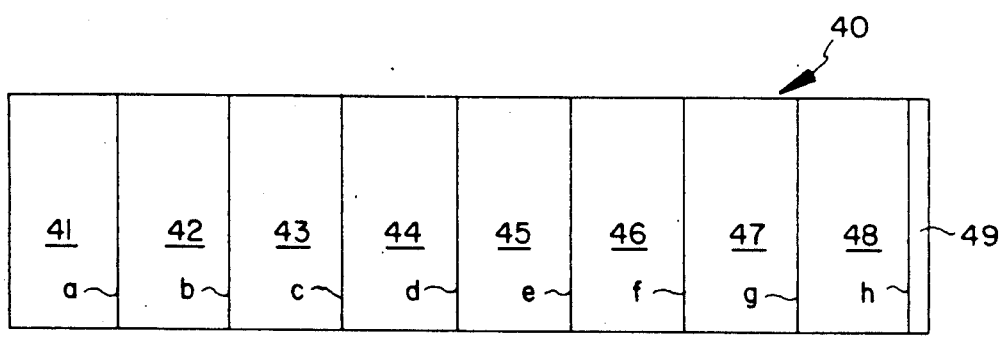
FIG. 7

BEVERAGE INFUSION DEVICE AND METHOD

BACKGROUND OF THE INVENTION

This application is a continuation-in-part of application Ser. No. 313,420, filed Feb. 22, 1989, now abandoned.

This invention relates to a device and method for producing a beverage from an infusible material such as coffee or tea. More particularly, the invention relates to the production of single cup beverage infusions using a device and method which provides increased mass transfer and extraction efficiency.

Numerous devices have been disclosed in the prior art for use in preparing individual servings of an infusible beverage, particularly coffee and tea. In such prior devices, a single or multi-compartment porous pouch containing a measured amount of the infusible material is attached to a holding means by which the pouch is immersed in a cup of hot water, with the holding means being manipulated to move the pouch in a repeated up-and-down or side-to-side or stirring motion in the water to prepare the beverage. A typical example is the common tea bag in which the infusion solid, tea, is infused in water by repeated dunking of the bag in hot water. While such prior devices have been satisfactory in the preparation of individual cups of tea, they have not been entirely satisfactory in the preparation of individual cups of coffee, due to the fact that it is more difficult to extract the components constituting coffee beverage from roasted coffee particulates. As a result, the use of prior devices and methods for producing individual cups of coffee by infusion of roasted coffee has required long extractions times and/or has resulted in the production of weak coffee beverage.

SUMMARY OF THE INVENTION

The present invention provides a device and method by which an individual cup of an infusible beverage, particularly coffee, of a desired concentration may be produced in a simple manner within a short period of time. The device of the present invention includes one or more porous pouches containing a measured quantity of infusible material (e.g. roasted coffee) secured to a rotatable shaft, which is dimensional to be hand held, with the pouches extending radially outwardly from the shaft. Single or multicompartment pouches may be utilized, with the measured quantity of infusible material being distributed substantially equally among all the pouches and/or compartments. The pouches are dimensioned to fit within a conventional beverage cup or mug and are secured to the shaft adjacent one end of the shaft. The pouches may be either permanently secured to the shaft, in which event the entire device is discarded after use, or may be removably secured to the shaft so that the shaft portion of the device is reusable with only the pouches being discarded after use. The shaft may be of any suitable cross-sectional configuration which enables it to be rotated between the thumb and finger of the user.

In use, the device is inserted in a suitable vessel, such as a conventional beverage cup or mug, filled with hot water so that the pouches are submerged in the water, and the upper end of the shaft, which extends above the upper edge of the vessel, is rotated between the thumb and forefinger in alternating clockwise and counter-clockwise directions. Upon rotation of the shaft and the pouches secured to the shaft, a centrifugal flow pattern is created in the water and the velocity of the extraction water passing through the mass of roasted coffee particles or other infusible material disposed in the pouches is increased. The centrifugal force created by the rapid rotation of the pouches forces the particulate infusible material in the pouches outwardly toward the outer edges of the pouches where the speed of rotation of the pouches in the water is the greatest, to promote extraction efficiency. By alternating the direction of rotation of the pouches, the pouches are constantly traversed in opposite directions by an alternating water current, thereby further enhancing extraction efficiency. In this manner an individual cup of coffee or other infusible material of a desired strength may be prepared within a relatively short period of time, after which the infusion device is removed from the cup. If the pouches are permanently secured to the shaft, the entire device is discarded after use. If the pouches are removably secured to the shaft, the pouches are separated from the shaft and discarded, while the shaft is retained for use with unused pouches in preparing another cup of the infusible beverage.

BRIEF DESCRIPTION OF THE DRAWING

FIG. 6 is a perspective view of the porous pouch component, showing the pouch in partially assembled form;

FIG. 7 is a plan view of the paper blank from which the pouch of FIG. 6 is formed;

FIG. 8 is a top plan view of the beverage infusing device having a pair of the pouches shown in FIG. 6;

DETAILED DESCRIPTION

The invention will be described with reference to a device and method for brewing an individual cup of coffee. However, it is to be understood that the beverage infusion device and method of this invention is not limited to the preparation of coffee beverage but is applicable to the infusion of other beverages, such as, for example, tea, herbal tea, herbal medicines, cold water soluble tea, and the like.

Figure 1:
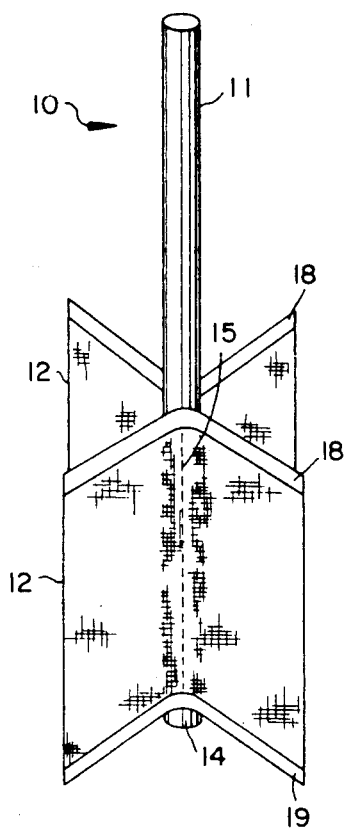
FIG. 1 is a perspective view of the beverage infusion device of the present invention.
Figure 2:
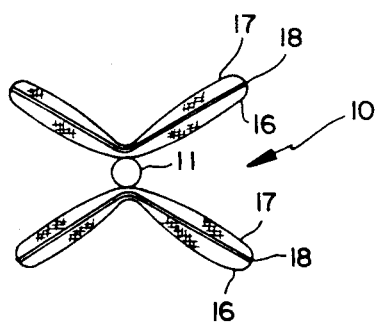
FIG. 2 is a top plan view of the beverage infusion device illustrated in FIG. 1.

Referring now more particularly to the drawings, FIG. 1 illustrates a beverage infusion device 10 of the present invention having a rigid or semi-rigid shaft 11 and a pair of sealed porous, flexible pouches 12 secured to the shaft adjacent the lower end 14 of the shaft, with the pouches extending radially outwardly from shaft 11. Pouches 12 are identical in size and configuration. Shaft 11 is dimensioned to be hand-held and rotated between the thumb and forefinger of the user, with the shaft having a length sufficient so that when the lower end 14 of the shaft is positioned at or adjacent the bottom of a conventional cup or mug, the upper end of the shaft extends above the top of the cup. Shaft 11 may be of any suitable cross- sectional configuration, that is, circular, oval or polygonal (e.g. square, triangular, hexagonal, etc.), which enables the shaft to be rotated between the thumb and finger of the user in preparing the beverage. Any suitable rigid or semi-rigid material which is capable of withstanding immersion in hot water may be used for the shaft, such as a plastic rod or tube.

Pouches 12 contain a quantity of particulate coffee sufficient for preparing an individual cup of coffee, with the coffee particles being distributed substantially equally among the pouches. The nature of the particulate coffee used is not critical. Preferably roasted coffee in finely divided and/or flaked form is used, with the pouches containing a total of about 6 to 12 grams of coffee. If desired, a minor amount (e.g. typically one gram or less) of soluble coffee powder may also be included in the pouches, in which event the amount of roasted coffee particles used may be reduced accordingly to prepare a cup of coffee having a desired strength. The pouches are generally rectangular or square in configuration and are dimensioned to have a width slightly less than the diameter of a conventional coffee cup or mug. That is, the diameter of the imaginary circle formed by the outer edges of the pouches is slightly less (e.g. 0.3 to 1.25 cm) than the inside diameter of the cup or mug, so that the pouches may be freely rotated in the cup. The height of the pouches is such that they are completely submerged when the device 11 is inserted in a cup of hot water. The pouches are constructed of flexible, porous material, such as water-permeable paper, which preferably is heat sealable. Preferably the pouches are formed of a single elongated sheet of the porous material with the ends of the sheet being folded over in an overlapping relationship to form opposing side panels 16 and 17 of pouch 12. The overlapping ends, as well as the top and bottom edges, of the sheet are secured together as at 18 and 19, respectively, by any suitable means, such as heat sealing, adhesive, and the.like, to form a sealed pouch. Before sealing the top edge 18 of the pouch, a measured or portioned amount of coffee particles is filled into the pouch. Alternatively, the pouch may be formed from separate sheets of the porous material with the sheets secured together in registered relation about the entire periphery of the sheets. If desired, opposing side panels 16 and 17 of the pouch may be sealed together along vertical midline 15 to divide each pouch into two separate sealed compartments which extend radially outwardly from shaft 11 when the pouch is secured to the shaft along midline 15.

The pouches 12 may be either permanently or removably secured to the shaft 11. Thus, if the entire infusion device is intended to be discarded after use, the pouches are adhered to opposite sides of the shaft along vertical midline 15 of the pouches bu any suitable means such as adhesive, heat sealing, mechanical fasteners, staples, and the like to permanently secure the pouches to the shaft. Alternatively, the pouches may be removably secured to the shaft so that only the pouch portion of the device is discarded after use, with the shaft being reusable. The use of a reusable shaft provides the advantages of reducing the manufacturing costs of the device, and enables a large number of the pouches to be packaged in a single container with only a few reusable shafts. The pouches may be removably attached to the shaft by any suitable means which ensures that the pouches will be secured to the shaft during rotation of the infusion device but which enables the pouches to be removed from the shaft after use. For example, such attachment means may take the form of a strip of double coated adhesive tape along the vertical midline of the pouches, mechanical fasteners inserted through the pouches along the vertical midline into openings in the shaft, and the like, including slots or clips provided on the shaft, as disclosed in more detail hereinbelow in connection with FIGS. 9-15.

Figure 3:
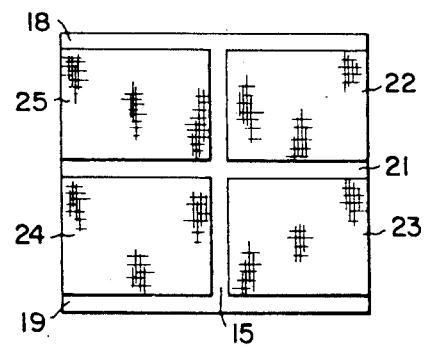
FIG. 3 is a side elevational view of another embodiment of the porous pouch component of the beverage infusion device.

According to another embodiment of the invention, as shown in FIG. 3, the opposing side panels of the pouch may be sealed together along horizontal midline 21 as well as along vertical midline 15 to divide the pouch into four separate sealed compartments 22, 23, 24 and 25. When multicompartment pouches are used, the coffee particles are distributed substantially equally among the compartments.

Figure 4:
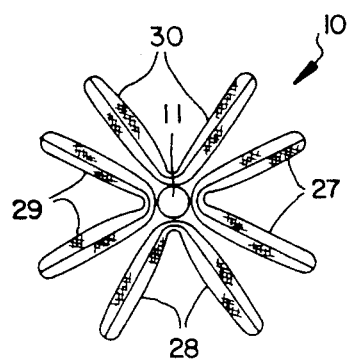
FIG. 4 is a top plan view of another embodiment of the beverage infusion device.

FIG. 4 illustrates an embodiment of the invention in which four pouches 27, 28, 29 and 30, each similar to pouch 12 of FIG. 1 are secured to the shaft 11 along the vertical midline of the pouches, with the pouches being spaced equidistant around the periphery of shaft 11 adjacent the lower end thereof. If desired, the opposing side panels of pouches 27, 28, 29 and 30 may be sealed together along the vertical midline of each pouch to provide the beverage infusion device with eight separate coffee-containing compartments extending radially outwardly from the shaft. Alternatively, the pouch configuration shown in FIG. 3 may be used, thereby providing the device with sixteen coffee-containing compartments. In general, extraction efficiency of the device increases as the number of pouches and/or coffee-containing compartments in the device is increased.

Figure 5:
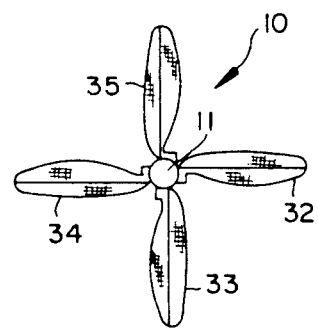
FIG. 5 is a top plan view of a further embodiment of the device.

FIG. 5 illustrates an embodiment in which four sealed pouches 32, 33, 34 and 35, each having a width of about one-half that of pouches 12 in FIG. 1 are secured equidistant around the periphery of shaft 11 adjacent the lower end of the shaft. The distance between the outer ends of opposing pouches (e.g. 32, 34) is slightly less than the internal diameter of the cup or mug in which the device is used.

FIG. 6 illustrates an embodiment in which the porous pouch contains four separate, but interconnected, compartments 36, 37, 38 and 39 formed from a single porous paper blank. As shown in FIG. 7, the blank 40 has eight interconnected panels 41, 42, 43, 44, 45, 46, 47 and 48 which are foldably connected along fold lines a, b, c, d, e, f, and g respectively. A sealing flap 49 is foldably connected to panel 48 along fold line h. To form the pouch from the blank 40, the panels are folded along their respective fold lines in alternating outward and inward directions, and sealing flap 49 is lapped over the marginal edge of panel 41 and bonded thereto by adhesive, heat sealing, or other suitable bonding techniques. The bottom edges of adjacent panels are then bonded together as at 19 to provide the structure shown in FIG. 6, having four separate but interconnected compartments. After a desired amount of coffee has been filled into the compartments, the top edges of adjacent panels are bonded together at 18 to provide a sealed pouch. Two of the sealed, coffee-containing pouches thus formed are secured to opposing sides of shaft 11 to provide the beverage infusion device shown in FIG. 8. The pouches may be secured to the shaft along the entire vertical midline of the pouches, or, alternatively, only at the top and bottom edges of the pouches at the vertical midline.

Figure 9:
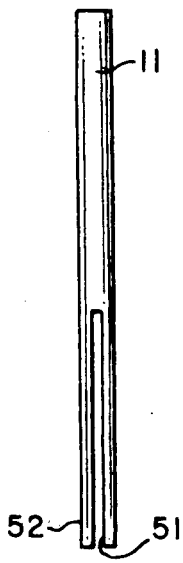
FIG. 9 is a side elevational view of the shaft portion of the device illustrating one embodiment of a reusable shaft.
Figure 10:
FIG. 10 is a bottom plan view of the reusable shaft shown in FIG. 9.

FIGS. 9–15 illustrate several embodiments of the shaft portion of the infusion device which are configured to permit the coffee-containing pouches to be removably secured to the shaft. As shown in FIGS. 9 and 10, a transverse slot 51 extends across the shaft upwardly from the base 52 of the shaft a distance approximately equal to the height of the pouches. One or more pouches are inserted into slot 51 along the vertical midline of the pouches whereby the pouches are frictionally engaged with and held in position by the lower end of the shaft.

Figure 12:
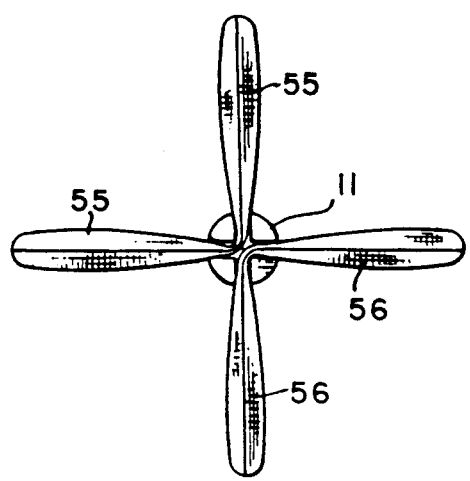
FIG. 12 is a bottom plan view of a beverage infusion device utilizing a reusable shaft shown in FIG. 11.
Figure 11:
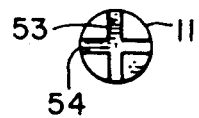
FIG. 11 is a bottom plan view of another embodiment of a reusable shaft.

In the embodiment shown in FIGS. 11 and 12, a pair of slots 53 and 54 are provided in the lower end of the shaft, with the slots extending through the shaft at right angles to one another. This configuration is adapted to carry a pair of pouches 55 and 56, with the pouches extending between adjacent legs of slots 53 and 54. That is, one compartment of a pouch is inserted into one leg of a slot (e.g. 53) and the other compartment of that pouch is inserted into the leg of the adjacent slot (e.g. 54), with the vertical midline of the pouch being positioned adjacent the apex of the angle formed by the intersection of the slots. Another pouch is then inserted into the remaining two unoccupied slots to provide the infusion device shown in FIG. 12.

Figure 13:
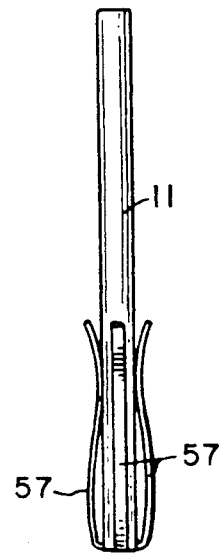
FIG. 13 is a side elevational view of another embodiment of a reusable shaft.

FIG. 13 illustrates a reusable shaft 11 having a plurality of clips 57 mounted at the base of the shaft. The clips are constructed of a stiff but resilient material and are adapted to clamp the pouches against the shaft along the vertical midline of the pouches.

Figure 14A:
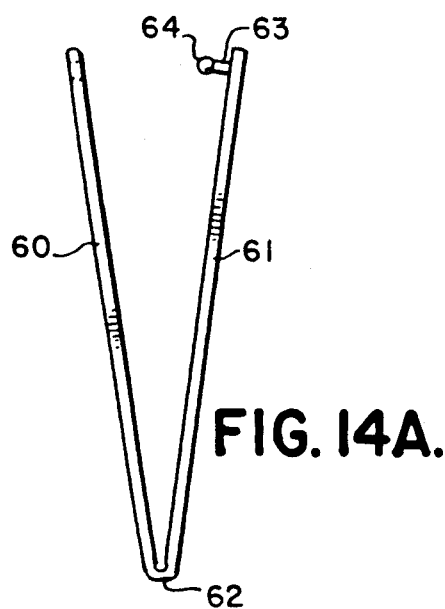
FIGS. 14A and 14B are side elevational views of another embodiment of a reusable shaft in open and closed positions, respectively.
Figure 14B:
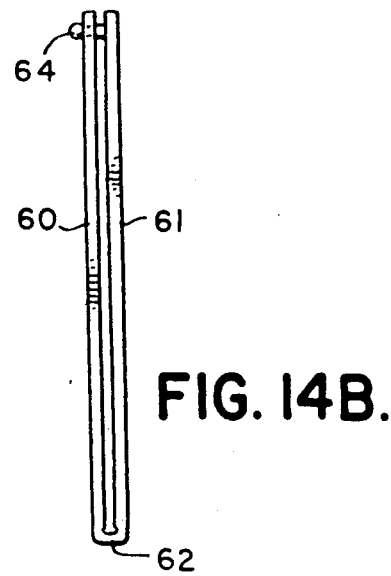

FIGS. 14A and 14B illustrate an embodiment of a reusable shaft in which the shaft is formed of a pair of legs 60 and 61 which are interconnected at the base of the shaft by means of an integral bight portion 62. An integral projection 63 having an enlarged end portion 64, is provided on the inner face of leg 61 adjacent the upper end thereof and is receivable within an opening (not shown) extending through the upper end of leg 60. In use, the shaft is opened, as in FIG. 14A, and one or more pouches are positioned between legs 60 and 61, adjacent bight portion 62, whereupon the legs are pressed together so that the enlarged end portion 64 of projection 63 extends through the opening in leg 60. In this manner the pouches are securely clamped in position for rotation of the device, and may be readily removed and discarded after use.

In operation, the beverage infusion device of the present invention, containing a total of about 6 to 12 gms of finely ground and/or flaked coffee is immersed in a conventional cup or mug containing hot water so that the pouches are fully submerged in the water and the upper end of the shaft extends above the rim of the cup. The shaft 11 is rapidly rotated, in alternating clockwise and counterclockwise directions, between the thumb and forefinger of the user for a short period of time, i.e. on the order of between about 30 to 180 seconds, preferably 45 to 90 seconds, to produce an individual cup of coffee having a strength and flavor characteristics comparable to brewed coffee. If soluble coffee is included in the pouches, an even shorter extraction period, even as short as 15 seconds, may be used. Upon rotation of the shaft and the pouches secured to the shaft, a centrifugal flow pattern is created in the water thereby increasing the velocity of the extraction water passing through the mass of coffee particles in the pouches. Moreover, due to centrifugal force, the coffee particles in the pouches are forced outwardly away from the shaft toward the outer edge of the pouches to form a bed where the velocity of the extraction water is greatest. Gas evolved during extraction is expelled outwardly by the same mechanism. In this manner, the efficiency of solubles from the coffee particles is greatly enhanced.

It will be recognized that the number of pouches and/or compartments in the device of this invention may vary widely. In general, the extraction efficiency of the beverage infusion device increases as the number of pouches and/or compartments is increased, since the use of multiple pouches and/or compartments facilitates increased contact between the coffee particles and the extraction liquid. Of course, the pouches and/or compartments must be sized to permit movement of the coffee particles therein. That is, the coffee particles must not be so tightly packed in the pouches and/or compartments as to restrict free contact between the water and the particles throughout the pouches in the preparation of a beverage. While the use of multiple pouches and/or compartments in the device of this invention is preferred, it is not essential, for the use of a device having a single pouch with a single compartment is still effective in producing a beverage having the desired strength and flavor characteristics in a short period of time.

Optionally, desired water soluble materials may also be included in the pouches together with the infusible material to provide a beverage having certain desired characteristics. For example, in the preparation of a coffee beverage, milk, cream or non-dairy creamers, in dry powdered form and/or sugar or powdered artificial sweeteners may be included in the pouches. Similarly, in the preparation of tea, powdered lemon flavoring may be included in the pouches.

What is claimed is:

1. A beverage infusion device capable of being inserted in a beverage cup for preparing an individual cup of an infusible beverage which comprises a rotatable rigid or semi-rigid shaft dimensioned and configured to be hand held and rotated between the thumb and forefinger of a user and having a length greater than the height of the beverage cup, and at least two porous rectangular pouches containing a measured quantity of an infusible beverage material, each of said pouches having a pair of opposing side panels sealed together around the periphery and along the vertical midline of said panels to divide each pouch into a pair of sealed compartments, with the beverage material being distributed substantially equally among the compartments, said pouched being secured to the shaft adjacent a lower end thereof along the sealed vertical midline of the pouches and spaced equidistant around the periphery of the shaft such that the side panels of the pouches extend radially outwardly from the shaft, said pouches being dimensioned to fit within a beverage cup and to be freely rotatable therein, the upper end of said shaft, being free of said pouches, extends out of said cup sufficient to be held and rotated by hand when said lower end and said pouches are fully enclosed in said cup.

2. The beverage infusion device defined in claim 1 in which at least said upper end of said shaft has a circular, oval or polygonal cross-sectional configuration.

3. The beverage infusion device defined in claim 1 in which the infusible beverage material is roasted coffee in fine ground and/or flaked form.

4. The beverage infusion device defined in claim 1 in which said pouches are removably secured to the shaft.

5. The beverage infusion device defined in claim 4 in which a pair of said pouches are removably secured to said shaft, with said lower end of the shaft having a pair of transverse slots extending through the shaft at right angles to one another, and the sealed vertical midline of said pouches are disposed in adjacent legs of said slots.

6. The beverage infusion device defined in claim 4 in which the shaft has a plurality of resilient clips mounted at the base adjacent said lower end thereof substantially equidistant around the periphery of the shaft, and the sealed vertical midline of the pouches is positioned against the shaft by one of said clips.

7. The beverage infusion device defined in claim 4 in which the shaft comprises a pair of legs interconnected at said lower end by an integral bight and having securing means at the opposing end for maintaining the leg in close proximate relationship, and at least a pair of said pouches are secured between said legs along the sealed vertical midline of the pouches.

8. The beverage infusion device defined in claim 1 in which the opposing side panels of said pouches are further sealed together along the horizontal midline of said panels to divide each pouch into four sealed compartments with the infusible material being substantially equally distributed among the compartments.

9. The beverage infusion device defined in claim 1 in which the beverage material comprises a major amount of roast and ground coffee and a minor amount of soluble coffee.

10. The method of preparing an individual cup of an infusible beverage which comprises immersing in a cup of hot water said infusion device of claim 1 so that said pouches are fully submerged in said water and the upper end of said shaft extends above the rim of said cup, and rotating the shaft in alternating clockwise and counter-clockwise directions to form a beverage infusion of desired concentration.

11. The method defined in claim 10 in which the beverage material comprises roasted coffee in fine ground and/or flaked form.

12. The method defined in claim 11 in which the beverage material includes a minor amount of soluble coffee.

13. The method defined in claim 10 in which the pouches are removably secured to the shaft.

* * * * *